United States Patent [19]

Rees

[11] Patent Number: 4,811,333

[45] Date of Patent: Mar. 7, 1989

[54] SUBSTANTIALLY NON-BLOCKING SPACE SWITCHING ARRANGEMENT

[75] Inventor: Frederick H. Rees, Winchmore Hill, Great Britain

[73] Assignee: STC PLC, London, England

[21] Appl. No.: 32,780

[22] Filed: Mar. 31, 1987

[30] Foreign Application Priority Data

Apr. 1, 1986 [GB] United Kingdom ................ 8607951

[51] Int. Cl.$^4$ ............................................. H04J 3/00
[52] U.S. Cl. ................................. 370/58; 340/825.8; 379/290
[58] Field of Search ............. 370/58, 60, 16, 94, 370/63; 340/825.79, 825.8; 379/271, 272, 273, 220, 221, 290, 291, 306, 335

[56] References Cited

U.S. PATENT DOCUMENTS

| | | | |
|---|---|---|---|
| 3,582,560 | 6/1971 | Banks | 340/825.8 |
| 3,649,768 | 3/1972 | Curtis | 379/272 |
| 3,920,914 | 11/1975 | Regnier et al. | 370/63 |
| 3,983,330 | 9/1976 | Tongi | 370/63 |
| 3,993,874 | 11/1976 | Arnold et al. | 379/272 |
| 4,004,103 | 1/1977 | Liu et al. | 379/290 |
| 4,071,702 | 1/1978 | Charransol et al. | 370/63 |
| 4,142,068 | 2/1979 | Charransol et al. | 370/63 |
| 4,400,627 | 8/1983 | Zola | 340/825.8 |
| 4,417,244 | 11/1983 | Melas | 340/825.8 |
| 4,455,645 | 6/1984 | Mijioka et al. | 370/58 |
| 4,536,870 | 8/1985 | Bovo et al. | 370/16 |
| 4,654,842 | 3/1987 | Coraluppi et al. | 370/58 |

Primary Examiner—Gerald P. Tolin
Assistant Examiner—Geoffrey S. Evans
Attorney, Agent, or Firm—Lee & Smith

[57] ABSTRACT

A telephone exchange, now often called a switch, includes a switching network of the space division type which switches PCM highways, and includes a number of sub-networks (SEG1, SEG2 ... SEGN) each of which is a plural (e.g. three) stage array. When a call is to be set up it is set up via one of these sub-networks, and a reserve path chosen for it through a different sub-network. The identity of this reserve path is noted in memory for use if the path via which the connection is actually set up fails. If that happens the call switched to the reserve path. This facility can also be used for "block transfers" of all calls in a sub-network, e.g. when the latter is taken out of service for maintenance. In one embodiment in which three stages are used, part at least of the middle stage is common to all sub-networks. Such an apparently large number of switching cross-points is not too "cost ineffective" since the switching sub-networks are made up of relatively cheap VLSI units. Since the physical paths are e.g. PCM-TDM highways which thus carry heavy traffic such precautions to maintain high system integrity are well worth while.

7 Claims, 6 Drawing Sheets

SUBSTANTIALLY NON-BLOCKING SPACE SWITCHING ARRANGEMENT

BACKGROUND OF THE INVENTION

The present invention relates to a space switching network which is, under failure-free conditions, substantially non-blocking, and which has a very low level of blocking under significant failure conditions.

Such networks are used in analogue switching systems for the switching of speech in analogue, non-multiplex form. However, at present a more important use of space networks is for the switching of time division multiplex (TDM) highways, which usually nowadays convey speech in pulse-code modulation (PCM) form. Thus the traffic carried by such a system is relatively heavy, so that it is highly desirable for it to be non-blocking. It is also desirable for the blocking level to be as low as possible under even relatively heavy failure conditions.

British Patent Specification No. 1393645 (International Standard Electric Corporation) to which corresponds U.S. Pat. No. 3,920,914 (Regnier et al) describes a telecommunication exchange in which part at least of the switching network is split into two separate parallel-connected sub-networks, each inlet and each outlet being connected to both sub-networks. When a connection is to be set up between an inlet and an outlet two paths are reserved, one in each of the sub-networks. Then one of the paths thus reserved is used for the connections; if that path fails or otherwise becomes unavailable, the other reserved path is used. As will be seen later, the present invention is an extension of the principle of the invention of the above-identified Patent Specification.

SUMMARY OF THE INVENTION

An object of the present invention is to provide a space switching arrangement in which the principles of the above Patent Specification are extended.

According to the invention there is provided an automatic telecommunication switching arrangement, which includes a switching network interconnecting inlets to the network and outlets from the network, in which the network is replicated into a plurality of switching sub-networks so arranged that any connection between an inlet and an outlet can be set up via any one of said sub-networks, wherein when a connection is to be set up the arrangement's control equipment chooses a path between the inlet and the outlet to be connected via one of said sub-networks and sets that path up, wherein after a said path has been set up a further search is made in the sub-networks for another path (hereinafter called a reserve path) which is usable for the same connection and the identity of that path is recorded in the control equipment's memory, wherein if the path originally set up for a connection fails or otherwise becomes unavailable for use that path is replaced by the reserve path selected for that connection, wherein when selecting a said reserve path note is taken of existing set up paths and of paths already reserved for possible use in the event of failure of the sub-network containing the path set up for that connection, and wherein the choice of a said reserve path for a connection is so done as to ensure that reserve path is not in the same sub-network as the path for which it is a reserve.

In such an arrangement it might seem at first that the amount of equipment needed could be inconveniently great. However, this is not so since the switching array proper can be made up of integrated circuit chips, preferably of the VLSI type. Such chips are relatively cheap, especially when account is taken of the benefits which result from their use.

BRIEF DESCRIPTION OF THE DRAWINGS

Embodiments of the invention will not be described with reference to the accompanying drawings, in which.

DESCRIPTION OF PREFERRED EMBODIMENTS

Figure 8:
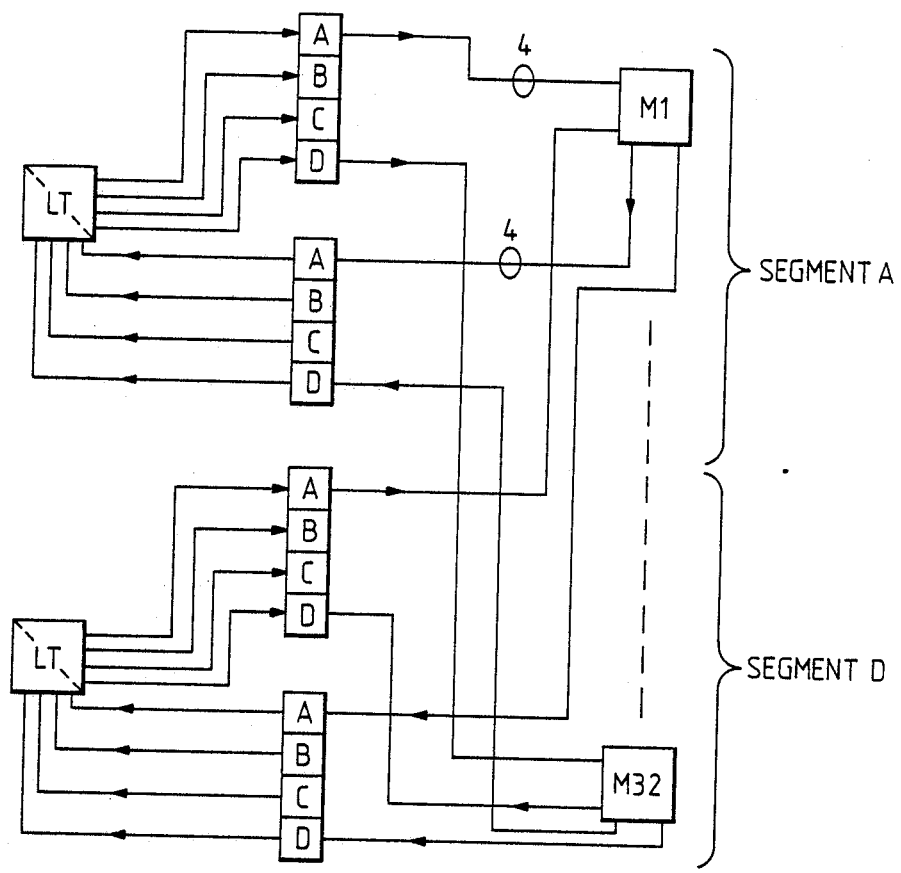
FIG. 8 is a trunking diagram of a further embodiment of the invention.

FIGS. 1 to 7 show switching arrangements to be used for the transmission of the information from any incoming port to any outgoing in the direction incoming line to outgoing line. Two such switching arrangements may be provided where the system has to function in a duplex manner. Hence FIG. 8 shows a system similar in principle to that shown in FIG. 2 for setting up duplex connections between any two terminations, using two paths through the switching arrangement.

As will be seen, in many applications of the invention, for transmitting information between any incoming line and any outgoing line, one switching arrangement is used for each direction, so that a duplex connection may be made between any incoming line and any outgoing line. In such applications, connections cannot be made between a pair of incoming lines and a pair of outgoing lines. Such a system could, for instance, be a transit exchange.

Figure 1:
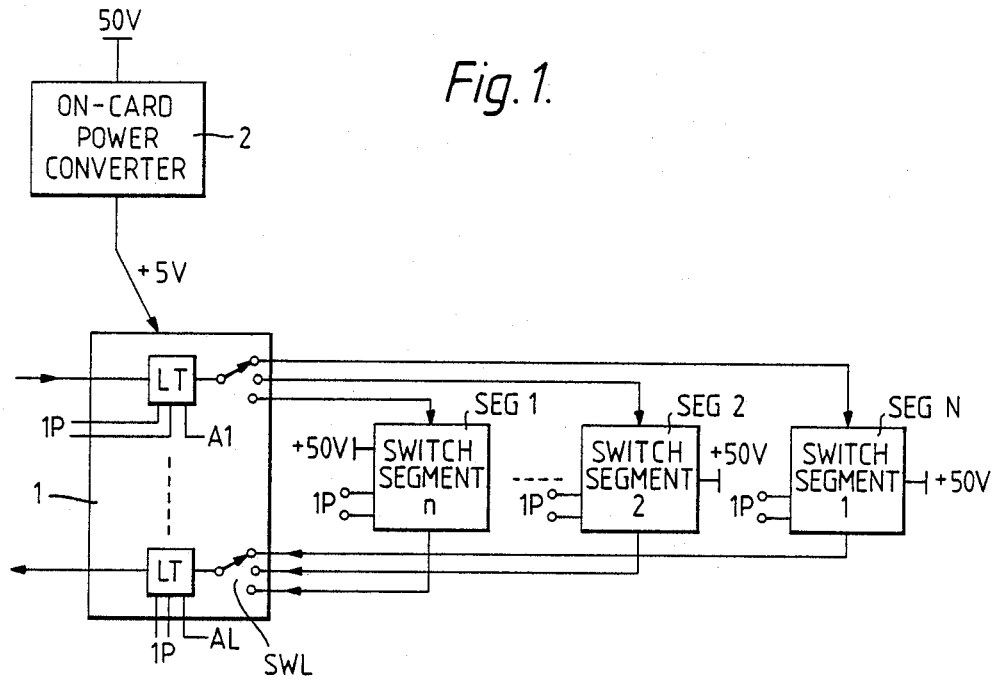
FIG. 1 is a schematic diagram of a switching arrangement embodying the invention.

In the system shown in FIG. 1, the block 1 includes a number of line terminations LT, each connected to an incoming line or an outgoing line, the terminations, whether for incoming lines or outgoing lines each being connectd to one of a number of segments of the switching network, either as an inlet thereto or as an outlet therefrom. A swtich SWL associated with line terminations for outgoing lines is used to select information from a particular segment, and similar switches are used to connect incoming line terminations to the switching segments. While these switches are shown as rotary switches they are in practice electronic arrangements.

Each of the switches such as SWL has n inlets which give access to inlets to or outlets from n switching network segments SEG1, SEG2, ... SEGN, each of which uses integrated circuit assemblies. The line line terminations LT each have duplicated instruction ports IP, for control of these switches and of the terminations generally.

When a connection is to be set up using one of the segments such as SEG1, a connection path via another segment is noted and its identity recorded in the control arrangement's memory, but the path is not taken into use. However, as long as traffic conditions permit, it is reserved for possible use in case the path via which the call was originally set up should fail. This arrangement can also be used for re-routing connections if this is considered useful for improving the system's traffic handling capacity. With contemporary electronic programme-controlled techniques, such transfers of the path in use for a call can be effected with sufficient speed for subscribers involved in that call not to be aware that anything has happened. A telephone exchange in which such re-routing is used is described in British Patent Specifications No. 932612 and 932613 (Standard Telephones and Cables Limited), to which two Patents corresponds U.S. Pat. No. 3,049,593 (Touraton et al) although in that case the exchange is not of the stored programme type.

In the system shown in FIG. 1, power for the block 1 and for much of the rest of the system is supplied via an "on-card" power converter 2 which derives power at 5 volt DC level, as used in the electronics, from the exchange DC source, which is usually 48 volts DC nominal. Other power supplying arrangements can be used if desired.

Figure 2:
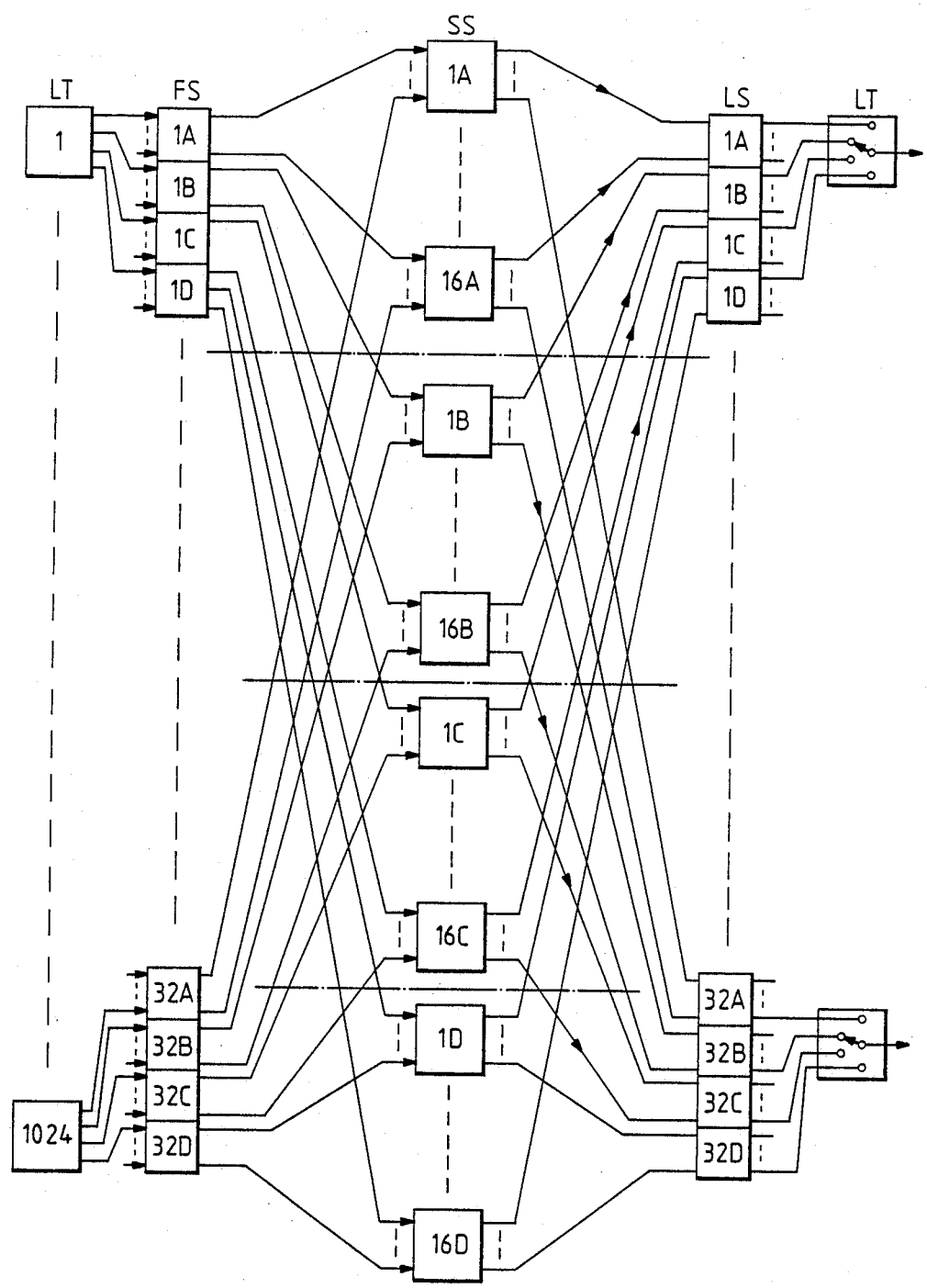
FIG. 2 is a trunking diagram of the switching network of FIG. 1, in more detail.

We now refer to FIG. 2, which shows a switching network which is of the traditional three stage form, but modified to embody the segmentation principle on which the present invention is based. This network includes a first stage FS which consists of 32 first stage units, each of which is formed by four co-ordinate matrices such as FS-1A to 1D each with 32 inlets. Each such inlet comes from one of 1024 line terminations LT, each of which has access to four of the first stage matrices. Each first stage matrix has 16 outlets, which go to the second stage SS.

The second stage includes 64 matrices, which are grouped as four sets of 16, i.e. SS1A-SS16A, SS1B-SS16B, and so on. It can be shown mathematically that the second stage in such a non-blocking system would need 63 such matrices, but it is convenient structurally to provide 64 matrices, one of which is used as a spare. The interconnection pattern between FS and SS is such that the outlets from the first stage matrix FS1A go to the 16 matrices SS1A-SS16A, the outlets from FS1B go to matrices SS1B-SS16B and so on.

The last stage LS is similar to the first stage, and is also connected to 1024 line terminations LT. Both at FS and LS, each line termination LT has access to four different FS or LS matrices. Thus LT1 has access to SS1A, SS1B, SS1C, SS1D, while outgoing LT 1024 is accessible from SS16A, SS16B, SS16C, SS16D, and similarly for other LT's. As in FIG. 1, to each incoming LT there corresponds an outgoing LT.

The pattern of interconnections between the stages SS and LS is similar to that between FS and SS, so it is not described in detail. It will be seen that the arrangement of FIG. 2 is symmetrical.

The segments in FIG. 2 are referred to as A, B, C and D, and the portions of the middle stage SS which belong to those segments are separated from one another by chain-dotted lines. It will be seen that segment A includes matrices 1A, 2A, ... 32A of stages FS, matrices 1A, 2A, 16A of stage SS, and matrices 1A, 2A, ... 32A of stage LS. It also includes all links between these matrices, and the connections from the FS and LS stages to the line terminations.

Each of the matrices shown in FIG. 2 is on a single card unit; for instance, two matrices can be on one card. In another embodiment of the invention, the matrices for stages FS and LS are 32×16, with two such matrices on one card. In this example the matrices for the stage SS are 32×32, each on one card. Such matrices are constructed using VLSI chips. Note that for different traffic handling characteristics, the numbers and sizes of the matrices used differ, as will be seen from the succeeding description.

In the system of FIG. 2, each output LT has the ability to select from which segment or sub-network of the network it can accept information. Hence at the input side, the information is offered to all four of the sub-networks, although this would not necessarily be the case for all systems using the present segmentation techniques. Duplicated controls can instruct the segmented switching stages as to the switch inlet from which information is to be routed for each outlet of the segmented switching stage. In addition, the outlet port may be instructed as to the segment of the array from which information is to be accepted for transfer in the appropriate form over the outlet port.

In the arrangement shown, a quarter of each of the first and third stages FS and LS, plus a quarter of the matrices of the second stage SS, are allocated to each segment or sub-network of the switching network. In some cases, all switch matrix cards of the same segment may be powered by the same power converter used to derive the 5 volt DC needed for those cards. Thus all cards of a segment would be rendered inoperable by a common failure. If this occurs, the duplicated common control can, by suitably instructing the switch cards of the other segments, reconstitute working cross-network paths such that all traffic in the failed segment is transferred to the other segments which are still serviceable. However, in most cases a failure is more localised and only causes a small number, or even only one, of the set up paths to fail. In such a case it is not necessary to reconfigure all paths using the segment or sub-network in which that failure occurred.

In the present system, when, during operation the central control wishes to set up a path between an inlet port and an outlet port, a search is made using the well-known map-in-memory technique to find a suitable path for that connection. This presents no problem regarding blocking. The selected path is then established and the map-in-memory is updated. After this set up has been done a further search is made for a reserve path across another segment, for use if the selected segments fails. Thus a map-in-memory is set up of the reserve paths to be used on the failure or part failure or paths in each segment. Such reserve paths would if necessary be used to set up paths across other segments. During the search for a reserve path, note is taken, also using map-in-memory techniques, of the existing paths set up and the paths reserved for use for failures of the segment selected. Note that a reserve path may not be set up across the segment in which the connections for which it is a reserve has been set up.

In a small proportion of path searches, no suitable free path for a reserve path may be available. This is because the network is not inherently non-blocking if a segment is unavailable. In such case, a suitable path can usually be found by replacing an already-reserved path with an existing available free reserve path, and using e.g. a link of that previously-reserved path for the new call. In exceptional cases such a path reservation may necessitate re-arranging more than one of the paths reserved for use in the event of failure. The results of all such re-arrangements are, of course, stored in the map-in-memory of the central control.

Each reserve path is related to a connected path and extends through a segment other than that used for the connected path. The reserve paths for the connected paths of a segment are mutually exclusive, and do not conflict with other reserve paths for the connected paths of that segment. They also do not conflict with any connected paths of the whole network. However, the reserve paths for the connected paths of one segment may conflict with the reserve paths for the connected paths of another segment of the network. After recovery from a failure, a rearrangement of reserve paths may take place to afford improved protection against further failures.

An advantage of the prior reservation technique described above is that when a failure is recognised, the central control may be directed to set up the paths needed for proper functioning and to limiting the effect of the failure. In one version, each outlet port is instructed on path set up of the identity of the inlet port from which it may receive information. Using redundancy within the information stream received by the outlet port, the latter can determine whether a path is satisfactory in respect of errors in that received information, and of the identity of the inlet port from which the information came. Thus all connected paths are monitored for correct connection and quality as long as they exist. An alarm, accessible to central control, is given when a connected path is found faulty.

One application of the type of system described herein is for an automatic digital distribution frame (ADDF), which is in effect a digital equivalent of a transit exchange. Such an ADDF may be locally or remotely controlled, and in the latter case instructions, reports, etc. are conveyed over a data link between the ADDF and a network management centre (not shown).

The central control is secure in its own right, and has a record of the paths to be connected. Since the division of the network into segments is so done that a fault only affects paths through one of the segments, if there is a failure of the connected paths of a segment, the central control can reconfigure those paths reported to be faulty within a satisfactory period, e.g. four seconds. Although a fault may only affect a few paths, it may be necessary when repairing such faults to extract cards, or switch off power supplies. This could affect paths then satisfactory unless they can be switched to another segment.

Figure 4:
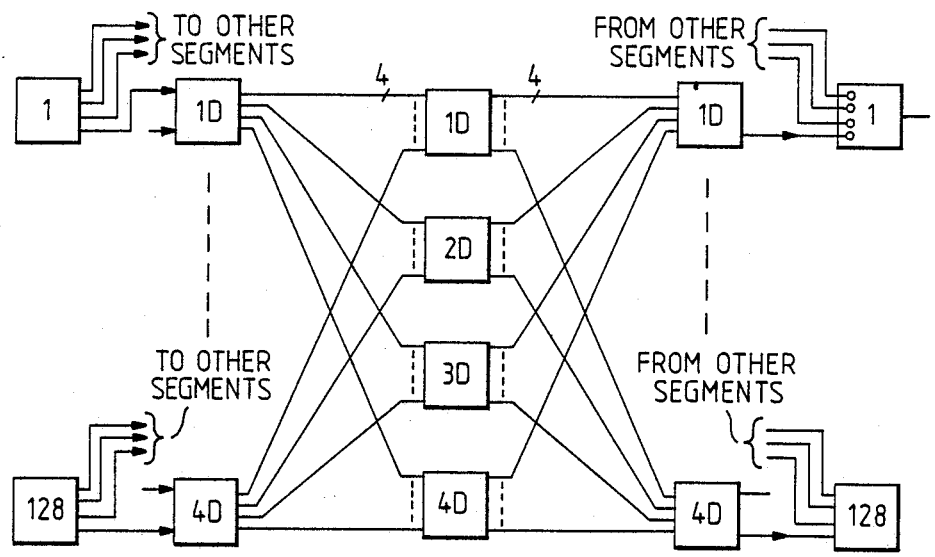
FIGS. 3, 4 and 5 are diagrams similar to FIG. 2 and useful in explaining the invention.
Figure 3:
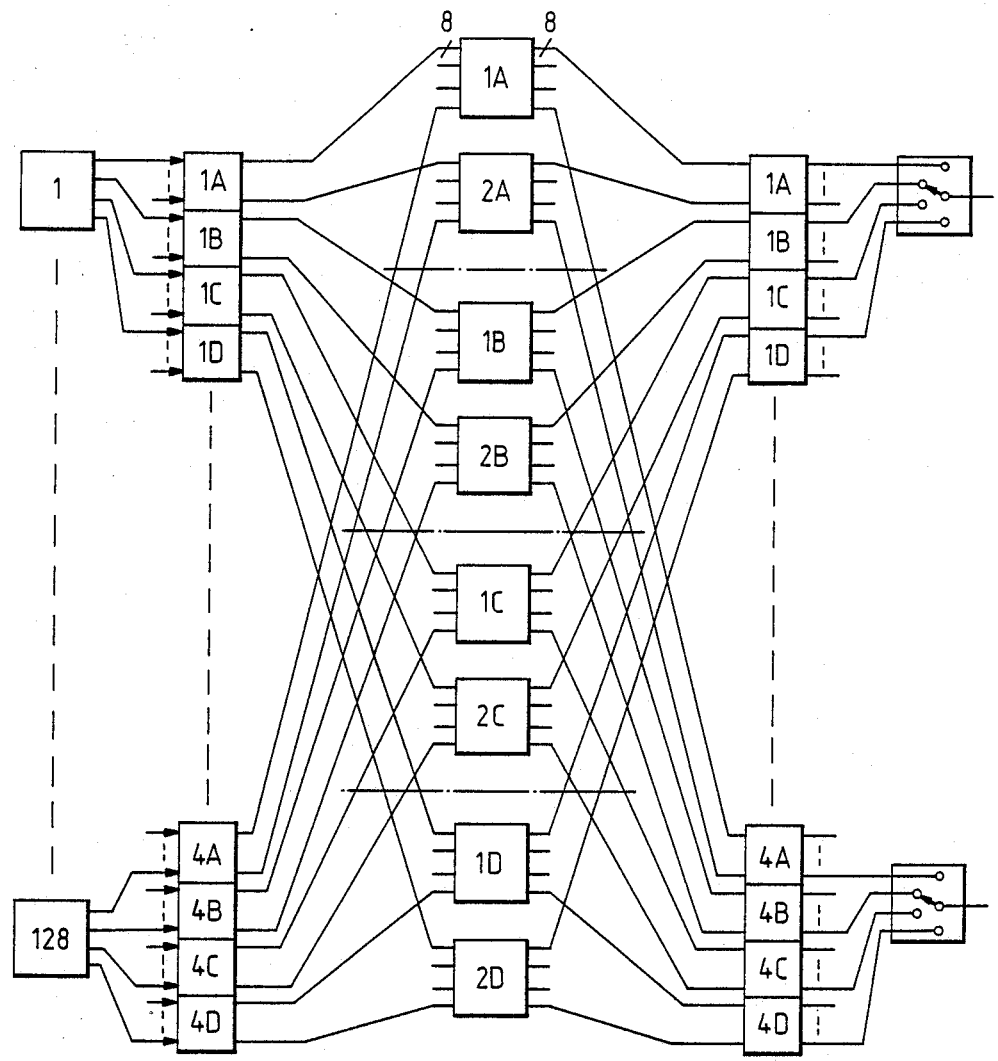
Figure 5:
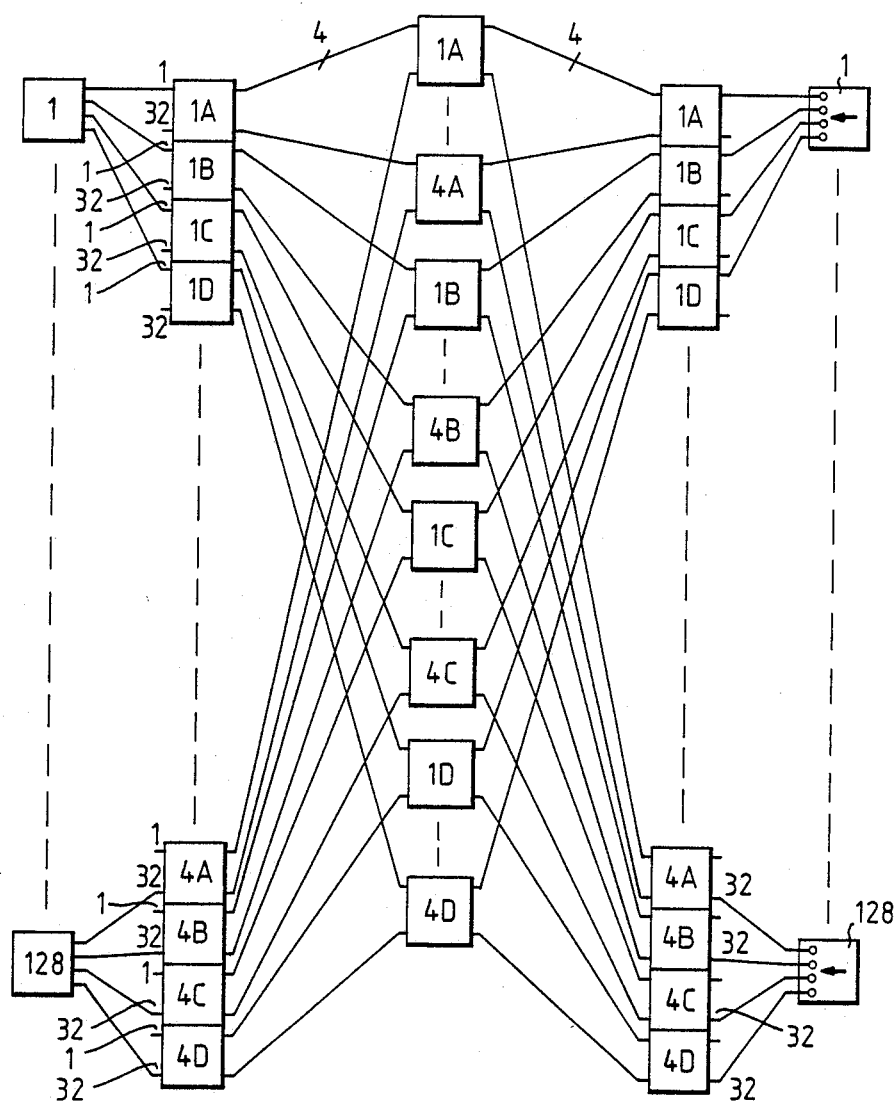
Figure 6:
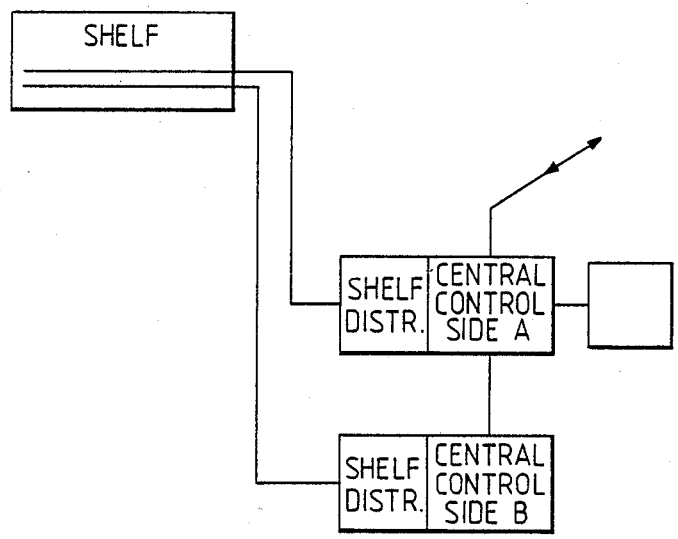
FIGS. 6 and 7 are simplified schematics relevant to the control of the networks shown in FIGS. 2 to 5.
Figure 7:
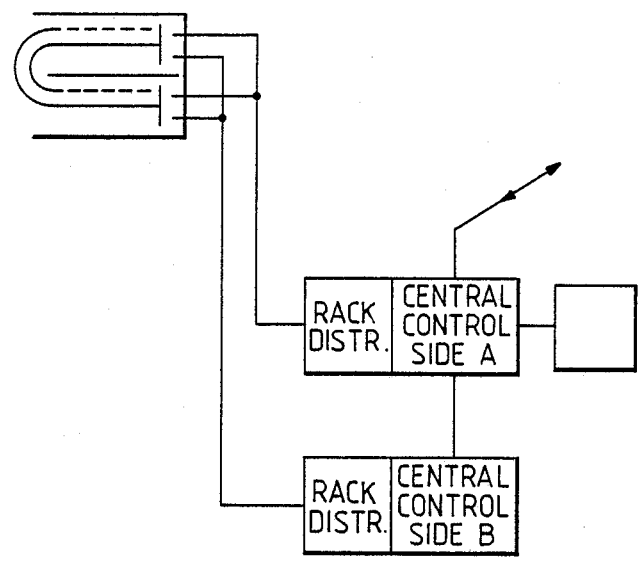

If it is necessary, for reasons of convenience and economny to reconfigure a segment, while to the users the switch appears to be operating normally, this is done by transferring the paths in one segment or sub-network to their reserve paths in other sub-networks, and then transferring the paths back to that segment after the reconfiguration of that segment. FIGS. 3, 4, and 5 illustrate a typical example of such reconfiguration, but assuming a rather smaller network than that of FIG. 2. When all segments have been reconfigured, the network is as in FIG. 5, and is capable of greater growth to 256 input and 256 output ports by the addition of more terminals and also first and third stage switches. The main part of the cost at the time of reconfiguration is that of the extra second stage paths needed.

Although some of the cross-points in FIGS. 3, 4 and 5 are in effect redundant this involves little or no cost penalty since, as indicated above, the switching matrices are VLSI devices. Thus in practice little or no savings can be achieved with fewer cross-points.

Thus the division of the switching network into segments or sub-networks improves the operating flexibility of the network in an economical manner. Thus it permits automatic reconfigurations, under the control of the central control (not shown), when path failure is detected. It also permits diversion of traffic under manual instruction to the central control with minimum, if any, disturbance to existing connections.

In changing from one path to another, where two paths are connected across the network in parallel but in different sub-networks, all that is needed is a single instruction to the outlet port which specified segment port Y. In the embodiments considered here one terminal card serves four input and four output ports. The terminal cards, which each serve four inlet and four outlet ports, receive instructions from duplicated control busses and also have their own secured or unsecured "on card" converter for power. Similarly, a complete segment or sub-network may receive instructions from duplicated command busses and may have its own converter for power.

In many embodiments, the inlet ports are associated with outlet ports. Typically a digital line termination card mounts four inlet and outlet ports associated with four line terminations. In most cases these operate at a 2 Mb/s rate although in some instances the digital line terminations may operate, e.g. at 8 Mb/s rate. In some cases both 2 Mb/s and 8 Mb/s systems may operate on the same switch, but in such applications, paths are only connected between inlet and outlet terminals of like-rate. In some embodiments the port cards are connected to two central controllers, for control (FIG. 6), by serial shelf busses. In other embodiments a single shelf controller per shelf is connected via two message interfaces per rack to the duplicate controllers of the central control. The shelf controller then controls digital line termination cards on the shelf, see FIG. 7, except when it has failed and control is via the shelf controller of an adjacent shelf. In either case a secured power supply and distribution may be used to power all the units on the shelf, or each line termination card has a DC to DC converter to convert from the rails supplied to it from battery to the 5 volts used by the logic.

A four segment switch is described here, the first and third stage switches are 4 in number, each of which is 32 in by 16 out, and 4 in number, each of which is 16 in by 32 out respectively. The second stage switches are $32 \times 32$.

The switch as in FIG. 2 can switch between 1024 input ports and 1024 output ports. In some cases a system in which the first and third stages are $48 \times 96$ switches rather than the $32 \times 64$ considered here, is preferred. With a $48 \times 96$ switch, 3 segments, not four, may be used; then it is possible to serve larger number of ports, e.g. up to 4,600 input and 4,600 output ports.

FIGS. 3 to 5 show how by the techniques implicity available in the design we may grow from small to large applications in an economic manner within a growth range, by providing additional first and third stages and ports as justified to the traffic served. Without the reconfiguration feature this leads to the provision of 64 second stage switches being used in the application shown in FIG. 3 instead of eight. Although these involve less crosspoints than the numer of crosspoints needed for the second stage switch at large sizes but with VLSI techniques, the number of crosspoints on a chip is not the important factor in respect of cost, rather is it the number of second stage switches which count in determining the cost.

The network is segmented into n segments, and with the software arrangement techniques available for use by the control, it is possible to operate the arrangement in live traffic on (n−1) segments. Hence if reconfiguration e.g. from FIG. 3 to an arrangement as shown in FIG. 4, takes place it is later possible to extend the growth range from that implicit in the configuration of FIG. 3 to that of FIG. 5. Each reconfiguration may involve e.g. the provision of twice as many second stages, and the reconfiguration of the links between first and second and between second and third stages of the switch. The links between these stages use twisted pairs, and rearrangement of the links between first and second and second and third stages may be afforded by the use of different back to back plugs for the different growth ranges. We may reconfigure segment D from that in FIG. 3 to that in FIG. 4 when:

(a) the reserve paths for the traffic through segment D have been set up through segments A, B and C, and (b) the outlet ports associated with these paths have then been activated to select the appropriate reserve path.

The links between the first and second and between the second and third stages of segment D are then reconfigured with the addition of two more second stage switches, and the set up of the paths is effected corresponding to the paths before reconfiguration has occurred.

The outlet ports associated with these paths are then activated to select segment D. Reserve paths for segments A, B and C through segment D are then updated to conform with the change.

Similar procedures occur to change the configuration of segments A, B and C until we have reconfigured each switch segment with 4 instead of 2 second stage switches capable of growth up to 256 ports from the 128 port system as shown in FIG. 5 by the provision of more line terminations and first and third stages corresponding to that growth.

At a furture date when growth has occurred on the switch such as to reach 256 ports and it is wished to expand the growth capability such that 512 ports may be accommodated then a reconfiguration would occur with the provision of 16 more second stage switches.

Later an extension of the growth range could occur with the provision of 32 more switches to enable growth to 1024 ports.

Growth beyond this involves either the replacement of the second stage switches (or the extension if possible in the implementation), such as to cater for e.g. a 64×64 per stage switching capability. Again the reconfiguration techniques described above are applicable.

The essentials of the approach can be seen by inspecting FIG. 3. Each second stage switch provided in this Figure serves eight first stage switches (see FIG. 2) and therefore there are 8 links connecting stage 1A (First Stage) to stage 2A (Second Stage). In the case shown in FIG. 5 there are 4 links connecting 1A (First stage) to stage 2A (Second Stage). After a further reconfiguration there would be two.

The trunking diagram for a cross-connect frame with a single switching arrangement embodying the invention is shown in FIG. 8, which shows a system with four switch planes for the first and third stages of a three stage network.

The first stage includes a number of line termination units LT, each of which is a digital line termination (DLT), to/from transmission, or a bridge link termination (BLT), to/from 64 kb/s layer of the system considered. Each first/third stage serves 64 incoming and 64 outgoing ports, which may include 32 DLT cards and 32 BLT cards. Associated with this each block of the first/third stage includes four 64×32 matrix assemblies, and as shown half the blocks act as incoming switches and half the blocks as outgoing switches. The middle stages M1–M32 are each e.g. 32×32 assemblies effectively in four segments, and the inter stage cabling connections can be varied as needed when the system size varies.

It will be noted that a single failure is not allowed to affect more than one segment of the middle stage.

Additional units or blocks can also be added for the centre stage if needed by traffic required.

The basic principles of the system can also be extended to four and five stage arrays. In all cases the system can be installed partly equipped so that when more lines have to be served, the alternations needed to the network are simple.

FIG. 8 assumes four segments A, B, C and D, of which the sets of switches connected to the uppermost LT block form segment A, segments B and C are not shown, and the two sets of switches connected to the lowermost LT block form segment D.

I claim:

1. An automatic telecommunication switching arrangement, which includes a switching network interconnecting inlets to the network and outlets from the network, which switching network is replicated into a plurality of switching sub-networks so arranged that any connections between an inlet and an outlet can be set up via any one of said sub-networks by contol equipment having a memory wherein:

the arrangment's control equipment chooses a path between the inlet and the outlet to be connected via one of said sub-networks and sets that path up;

after a said path has been set up a further search is made in the sub-networks for another path (hereinafter called a reserve path) which is usable for the same connection and the identity of that path is recorded in the control equipment's memory.

if the path originally set up for a connection fails or otherwise becomes unavailable for use that path is replaced by the reserve path selected for that connection;

when selecting a said reserve path note is taken of existing set up paths and of paths already reserved for possible use in the event of failure of the sub-network containing the path set up for that connection;

the choice of said reserve path for a connection is so done as to ensure that the reserve path is not in the same sub-network as the connection path for which it is a reserve, if an entire switching sub-network fails all connections set up therethrough are transferred to their reserve paths;

if after such a failure of an entire sub-network no reserve path exists for a connection to be set up a reserve path is selected by reserving the said replacement path; and means is provided whereby if necessary more than one such replacement may be effected.

2. An arrangement as claimed in claim 1, wherein the switching network has three stages, the first and the third stages being replicated into respective ones of said sub-networks, but the second stage switches each being accessible to two or more of the first and third stage sub-networks.

3. An arrangement as claimed in claim 1, wherein the switching network has three stages and there are four wholly separate sub-networks.

4. An arrangement as claimed in claim 1, wherein the switching network has five stages, with all sub-networks being fully separated from each other.

5. An arrangement as claimed in claim 1, wherein the physical paths which are switched via the arrangement are PCM-TDM highways.

6. An arrangement as claimed in claim 1, wherein the switching sub-networks are made up of interconnected stages of co-ordinate matrices implemented on VLSI.

7. An automatic telecommunication switching arrangement, which includes a switching network interconnecting inlets to the network and outlets from the network, which switching network is replicated into a plurality of switching sub-networks so arranged that any connection between an inlet and an outlet can be set up via any one of said sub-networks by control equipment having a memory wherein:

the arrangement's control equipment chooses a path between the inlet and the outlet to be connected via one of said sub-networks and sets that path up;

after a said path has been set up a further search is made in the sub-networks for another path (hereinafter called a reserve path) which is usable for the same connection and the identify of that path is recorded in the control equipment's memory;

if the path originally set up for a connection fails or otherwise becomes un-available for use that path is replaced by the reserve path selected for that connection;

the choice of a said reserve path for a connection is so done as to ensure that the reserve path is not in the same-sub-network as the connection path for which it is a reserve; and to replace the path in use for a connection with its reserve path after that reserve path has been set up through the switching arrangement a message is sent to the outlet for that connection to instruct that outlet to respond to information received from the sub-network via which the reserve path extends which causes that reserve path to be rendered effective.

* * * * *